Sept. 20, 1955　　　　　　　　E. H. GAMBLE　　　　　　　2,718,614
LINEAR TORQUE MOTOR
Filed Nov. 22, 1952　　　　　　　　　　　　　　　　2 Sheets-Sheet 1

TORSION SHAFT $\delta°$

IN. lbs.

$\beta$ FLUX DENSITY

Inventor
EDWARD H. GAMBLE
By Orin R. Severn
his Attorney

Sept. 20, 1955   E. H. GAMBLE   2,718,614
LINEAR TORQUE MOTOR
Filed Nov. 22, 1952   2 Sheets-Sheet 2

Inventor
EDWARD H. GAMBLE
By
Orin R. Severn
his Attorney

United States Patent Office 2,718,614
Patented Sept. 20, 1955

2,718,614

LINEAR TORQUE MOTOR

Edward H. Gamble, Lancaster, Ohio, assignor to Curtiss-Wright Corporation, a corporation of Delaware Application November 22, 1952, Serial No. 322,063

6 Claims. (Cl. 317—171)

My invention relates to a torque motor having an armature which normally assumes an equilibrium position but it is operable in one direction or another from its position of equilibrium to control the operation of connecting mechanism.

It is an object of my invention to provide a torque motor of the described type wherein displacement of the armature from its position of equilibrium is linearly proportional to a differential input voltage.

It is a further object of my invention to provide such a torque motor wherein the armature is continually acted upon by magnetic forces which are in balance only in the equilibrium position of the armature, and suitable means are provided to unbalance the said magnetic force and thereby cause the armature to tilt in one direction or another from its normal position.

Other objects and advantages of my invention will become apparent as the course of the specification progresses.

I shall describe one form of my invention and then point out the novel features thereof in the claims.

In the accompanying drawings Fig. 1 is a perspective view of the torque motor with one of the cover plates removed to show the interior construction.

Figures 1, 2, 3, 4:
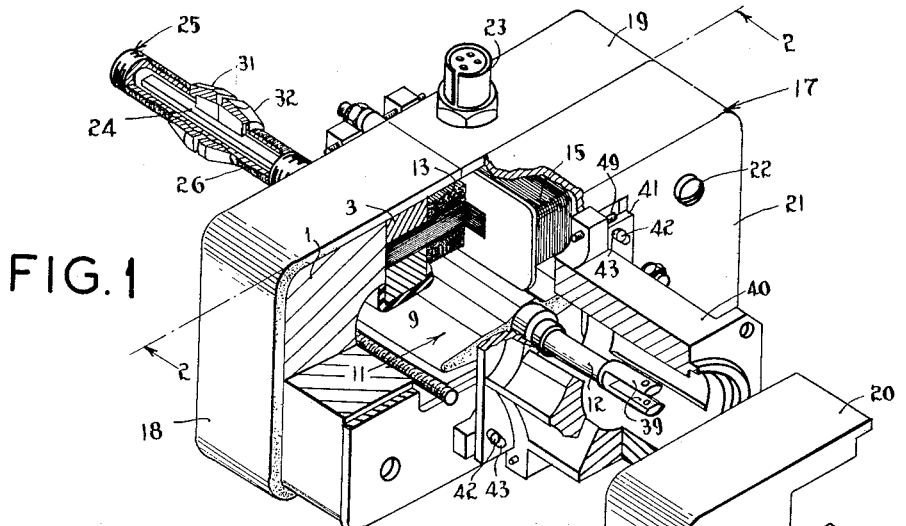
Fig. 2 is a vertical cross sectional view taken on the plane of the line 2—2 of Fig. 1.
Fig. 3 is a schematic illustration showing the control coils which are employed to move the armature from its normal equilibrium position.
Fig. 4 is a graphical representation illustrating the linear characteristics of the motor.
Figure 5:
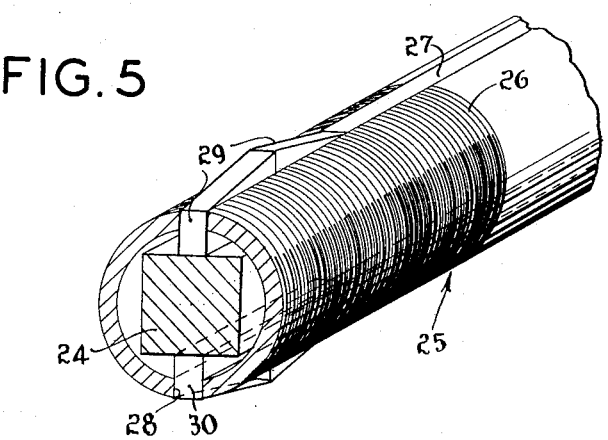
Fig. 5 is a perspective view partially in section and showing means used in adjusting the effective length of a torque rod fixedly connected with the armature.

Referring to the drawings, reference characters 1 and 2 designate a pair of U-shaped permanent magnets which may be of any suitable magnetic material having a high retentivity. Magnets 1 and 2 may for example be formed of the magnetic alloy commercially known as Alnico and consisting of aluminum, iron, nickle and cobalt. As indicated, the permanent magnets are arranged with like poles in opposed spaced relationship and the poles of the permanent magnets contact pole pieces 3, 4, 5 and 6 respectively. Pole pieces 3 and 4 have opposing pole faces separated by an air gap 7 and similarly pole pieces 5 and 6 have other opposing pole faces operated by an air gap 8. Magnetism is of course induced in the various pole pieces by means of permanent magnets 1 and 2 such that the opposing pole faces are of unlike polarity.

Disposed in air gaps 7 and 8 are opposite end positions 9 and 10 respectively of an armature 11 having a pivotally mounted shaft 12 fixedly connected thereto intermediate the end positions. Armature 11 may be formed of any suitable magnetic material having a high permeability. The armature forms a portion of a flux path which as indicated in Fig. 2 extends through the armature and between dissimilar poles of the oppositely disposed permanent magnets. Accordingly, the armature is continually acted upon by magnetic forces. Normally, however, the armature is disposed in a position of equilibrium corresponding to that shown in Fig. 2 in which position the magnetic forces acting upon the armature are in balance.

Suitable means are provided to angularly displace the armature in one direction or another a desired amount from the normal equilibrium position and as shown include control coils 13, 14, 15 and 16 which are disposed in juxtaposition to pole pieces 3, 4, 5 and 6 respectively. Coils 13 and 16 are connected in series as are coils 14 and 15, and when differential voltages such as $e_1$ and $e_2$ are respectively impressed across the one pair of coils 13 and 16 and across the other pair of coils 14 and 15 additional flux is created in the armature and pole pieces to unbalance the magnetic forces acting upon the armature and cause the armature to tilt in one direction or the other depending upon the relative magnitudes of the impressed voltages and the direction of the resulting current in the coils.

The hereinbefore described parts including the permanent magnets, the pole pieces and control coils are encased in a suitable housing 17 comprising cover plates 18, 19, 20 and 21 which are secured to the permanent magnets by bolts 22. Mounted on housing 17 is a plug connector 23 which connects with each pair of the series connected control coils.

Armature 11 is fixedly connected to a torsion rod 24 which is unstressed in the normal position of the armature but is increasingly stressed over its effective length, which is determined in a manner hereinafter explained, as the armature is moved away from its normal position by reason of a differential voltage in the control coils. The torsion rod is effective because of the potential energy stored therein as the armature is moved from its normal position to restore the armature to such normal position when the differential voltage ceases to exist.

Torsion rod 24 is housed in a cylindrical casing 25 which is securable in a fixed position with respect to housing 17. Cylindrical casing 25 has its outer surface 26 threaded and longitudinal openings 27 and 28 are provided on opposite sides for respectively receiving pairs of wedged shaped blocks 29 and 30 which engage opposite sides of rod 24 and can be clamped in any desirable position along the rod by means of clamps 31 and 32 having threaded engagement with cylindrical casing 25 to determine the effective length of the rod, that is that portion of the rod which is placed under stress as the armature is moved from its normal position by the control coils. Assuming a particular effective length of rod 24 as determined by the position of blocks 29 and 30, when a differential voltage is set up in the control coils the armature 11 moves from its normal position an amount depending upon the magnitude of such differential voltage and in a direction dependent upon the direction of current flow in the control coils due to impressed voltages.

With the described arrangement the relationship between differential voltage and the angularly displacement of the armature is substantially linear over the first few degrees of displacement as for example 3° in one direction or another from the equilibrium position. This is an important feature of applicant's invention and because of it the motor lends itself to many applications in which a linear response proportional to an input signal is required. This characteristic is illustrated graphically in Fig. 4 wherein flux density B which is of course dependent upon the differential voltage is shown plotted against the torque exerted on the armature at 33. Variations in angular displacement of the armature as compared to the torque exerted on the torque rod are also shown in Fig. 3 at 34 and of course this relationship is in accordance with Hooke's law, also linear.

It is another feature of my invention inherent in the construction of the motor that the angular displacement of the armature from its normal equilibrium position varies only slightly over a wide frequency range for a constant differential current in the control coils. The frequency of the current in the control coils may for example be varied from 0 cycles per second to over 180 cycles per second while a constant differential current obtains without greatly affecting the armature position.

Preferably armature 11 is tapered in the manner shown in Fig. 2 to reduce its mass and render it more sensitive to flux changes. In view of the tapering of the armature, the pole faces of pole pieces 3, 4, 5 and 6 are formed at an angle such as to produce the most desirable flux condition within the operating range of the armature wherein a linear relationship exists between the differential voltage and displacement. The pole faces are capped by non-magnetic cushions 35, 36, 37 and 38 respectively to prevent the armature from sticking to the pole faces in one or another of the extreme positions to which it is capable of being operated and as determined by the engagement of the armature with the capped pole faces. The motor may as shown in Fig. 2 be so constructed that such extreme positions correspond to about a 3° angular displacement of the armature which is the normal operating range for linearity. However the construction may be such that the extreme positions correspond to an armature displacement considerably in excess of 3°, and may be of the order of 6° or 7° without affecting the substantial linear response hereinbefore discussed over the first few degrees of displacement from the equilibrium position.

Figure 6:
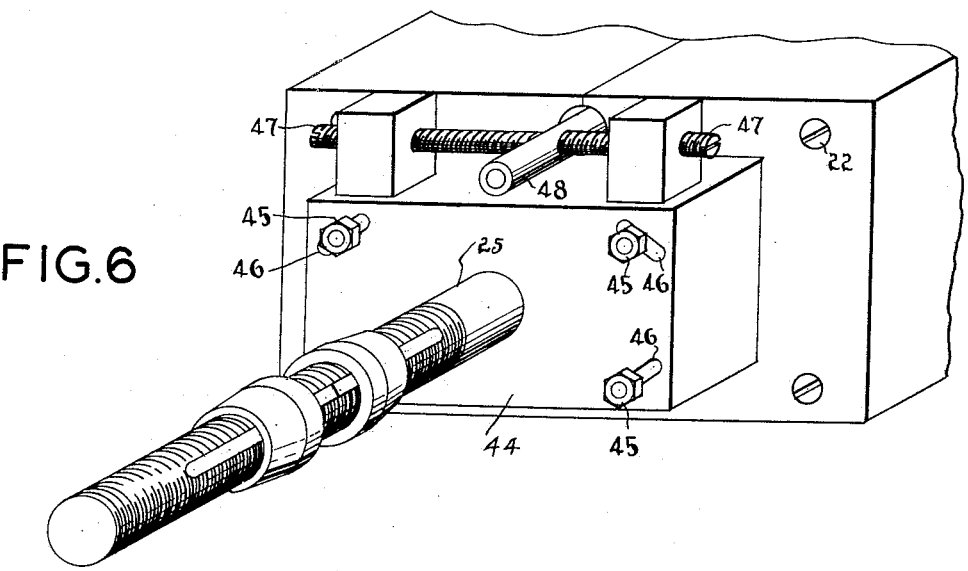
Fig. 6 is a perspective view showing means for adjusting the armature to its normal equilibrium position.

The torque motor may for example be utilized to linearly control the flow of fuel in response to a differential voltage through a metering valve such as shown in the co-pending application Serial No. 323,179 of Elwyn Peters filed November 29, 1952, the armature shaft 12 being formed as at 39 to connect with the valve spindle. In such event the motor will be provided with suitable means for adjusting the position of the valve manifold with respect to the valve spindle and armature shafts. For this purpose I provide a casting 40 which is adapted for connection at one end to the valve housing and has an end plate 41 at its other end mounted on bolts 42 which extend through slots 43 in the corners of the end plate and are secured in the permanent magnets. Casting 40 is in this manner rendered slidably adjustable with respect to the motor housing and can be moved relative thereto to control the position of the valve manifold. Similar means disposed on the other side of the motor housing from the valve adjusting means are provided for adjusting the position of the armature to its normal equilibrium position between the opposing faces of the pole pieces and as shown (Fig. 6) include plate member 44 which is slidably mounted on bolts 45 extending through slots 46 in the corners of the end plates and secured in the permanent magnets. Plate member 44 is fixedly secured to casing 25 and can be accurately positioned to locate the armature by means of adjusting screws 47 which engage fixed post 48. The casting 40 for positioning the valve manifold is slidably adjusted by means of adjusting screws 49 (only one being shown) which also engage a suitable fixed post and function in the same manner as screws 47.

It should be understood that this invention is not limited to specific details of construction and arrangement thereof herein illustrated, and that changes and modifications may occur to one skilled in the art without departing from the spirit of the invention.

What is claimed is:

1. A torque motor comprising two pair of magnetizable pole pieces with the pole pieces of each pair having oppositely disposed pole faces separated by an air gap, a cushion of non-magnetic material on each of the opposing faces of the pole pieces, an armature of magnetizable material having opposite end portions disposed between opposing pole faces of different pairs, a pair of permanent magnets in juxtaposition to each pair of pole pieces respectively to magnetize said pole pieces such that oppositely disposed pole faces are of dissimilar magnetic polarity and pole faces on the same side of the armature are of like polarity thereby creating flux lines extending through the armature and connecting pole pieces of different pairs on opposite sides of the armature, said armature being pivotally mounted intermediate said end portions and being normally disposed in an equilibrium position in which said end portions occupy intermediate positions in the air gaps between opposing pole faces and the magnetic forces acting on the armature are in balance, a pair of coils connected in series and in close juxtaposition respectively to a pole piece of one pair and to a pole piece having a dissimilar pole face of the other pair, another pair of similar coils connected in series and in close juxtaposition respectively to the other pole pieces in the different pairs, said coils being effective when a voltage impressed across one pair of coils differs from a voltage across the other coils to unbalance the magnetic forces acting on the armature and cause the armature to tilt in one direction or another from its normal equilibrium position, and a torsion rod fixedly connected to the armature for exerting a restoring torque on the armature as the armature is tilted from its normal position, a housing for the torsion rod securable in a fixed position relative to said pole pieces and having longitudinal slots therein, holding blocks in contact with the torsion rod and slidable in said longitudinal slots, and means for securing said blocks in a fixed position in the longitudinal slots to hold the rod against movement at said fixed position.

2. The combination as defined in claim 1 with the addition of means fixedly secured to said torsion rod housing and slidably adjustable to a fixed position relative to said pole pieces for locating the armature in its normal equilibrium position.

3. A torque motor comprising two pair of magnetizable pole pieces with the pole pieces of each pair having oppositely disposed pole faces separated by an air gap, an armature of magnetizable material having opposite end portions disposed between opposing pole faces of different pairs, means for magnetizing said pole pieces such that oppositely disposed pole faces are of dissimilar magnetic polarity and pole faces on the same side of the armature are of like polarity thereby creating flux lines extending through the armature and connecting pole pieces of different pairs on opposite sides of the armature, said armature being pivotally mounted intermediate said end portions and being normally disposed in an equilibrium position in which said end portions occupy intermediate positions in the air gaps between opposing pole faces and the magnetic forces acting on the armature are in balance, means for unbalancing the magnetic forces acting on the armature to cause the armature to tilt in one direction or the other, a torsion rod fixedly connected to the armature for exerting a restoring torque thereon as the armature is tilted from its normal position, and means for adjusting the length of said rod to increase or decrease the restoring torque exerted thereby.

4. A torque motor comprising two pair of magnetizable pole pieces with the pole pieces of each pair having oppositely disposed pole faces separated by an air gap, an armature of magnetizable material having opposite end portions disposed between opposing pole faces of different pairs, means for magnetizing said pole pieces such that oppositely disposed pole faces are of dissimilar magnetic polarity and pole faces on the same side of the armature are of like polarity thereby creating flux lines extending through the armature and connecting pole pieces of different pairs on opposite sides of the armature, said armature being pivotally mounted intermediate said end portions and being normally disposed in an equilibrium position in which said end portions occupy intermediate positions in the air gaps between opposing pole faces and the magnetic forces acting on the armature are in balance, means for unbalancing the magnetic forces acting on the armature to cause the armature to tilt in one direction or the other, a torsion rod fixedly connected to the armature for exerting a restoring torque thereon as the armature is tilted from its normal position, means for adjusting the length of said rod to increase or decrease the restoring torque exerted thereby, and means for adjusting the armature and torsion rod to adjust the normal equilibrium position thereof.

5. A torque motor comprising an armature, a pair of pole pieces spaced apart between which said armature is movable, means to energize said pole pieces magnetically, to move said armature therebetween, means mounting said armature for pivotal movement, a torsion rod fixedly connected to said armature for exerting torque to restore said armature upon movement thereof, an anchorage adjustable to alter the effective length of said torsion rod to vary the restoring torque exerted thereby, and means for fixedly securing said anchorage against rotation relative to said torque motor.

6. A torque motor comprising an armature, a pair of pole pieces spaced apart between which said armature is movable, means to energize said pole pieces magnetically, to move said armature therebetween, means mounting said armature for pivotal movement, a torsion rod fixedly connected to said armature for exerting torque to restore said armature upon movement thereof, an anchorage adjustable to alter the effective length of said torsion rod to vary the restoring torque exerted thereby, and means for fixedly securing said anchorage against rotation relative to said torque motor, said securing means being rotatably adjustable for setting the rest position of said armature between said pole pieces.

References Cited in the file of this patent

UNITED STATES PATENTS

| | | |
|---|---|---|
| 698,027 | Knapp | Apr. 22, 1902 |
| 1,572,452 | Thomas | Feb. 9, 1926 |
| 1,837,188 | Keller | Dec. 22, 1931 |

FOREIGN PATENTS

| | | |
|---|---|---|
| 123,049 | Switzerland | Oct. 17, 1927 |